April 16, 1968

M. E. GARRETT ET AL 3,377,812

REARRANGEMENT OF FLOW-THRU SERIAL ADSORBERS TO
REMOVE GASEOUS CONSTITUENTS

Filed March 10, 1965

INVENTOR
Michael E. Garrett
David A. Webber

By Stevens, Davis, Miller & Mosher
ATTORNEYS

United States Patent Office 3,377,812
Patented Apr. 16, 1968

3,377,812
REARRANGEMENT OF FLOW - THRU SERIAL ADSORBERS TO REMOVE GASEOUS CONSTITUENTS
Michael Ernest Garrett, Streatham, London, and David Arthur Webber, Carshalton, England, assignors to The British Oxygen Company Limited, London, England, a British company
Filed Mar. 10, 1965, Ser. No. 438,616
Claims priority, application Great Britain, Mar. 10, 1964, 9,956
10 Claims. (Cl. 62—18)

ABSTRACT OF THE DISCLOSURE

A process for removing from a gaseous mixture a constituent, which is preferentially adsorbed at low temperatures, by passing the mixture serially through at least three cyclically switchable adsorbers operating in a cycle divided into a number of periods equal to the number of adsorbers. When the major part of the constituent adsorbed in the first adsorber is expelled therefrom, the adsorbers are switched so that the last adsorber of one period becomes the first adsorber of the next period. The last adsorber during any period is maintained at the low temperature required by external cooling.

This invention relates to the removal of one or more constituents from a gas mixture and particularly to the removal from a gas mixture of one or more constituents thereof which are preferentially adsorbed at a low temperature. The process is particularly applicable to the removal from a gas or gas mixture of one or more impurities, such as, for example, the removal of small quantities of nitrogen from helium, but it is not limited to such applications.

In plants for the treatment of cryogenic fluids, for example, helium or hydrogen, and particularly in refrigerator for such fluids, the presence of relatively high melting impurities, such as, for example, nitrogen in the fluids, which impurities are most likely to be derived from leakages into the fluid from the atmosphere, may cause frequent blockages in the heat exchangers used and may hence lead to a complete failure of the plant. In order to eliminate such impurities, it has been proposed to pass the impurity-containing fluid through a vessel which contains an adsorbent, such as activated charcoal, at a temperature of about 80° K., under which conditions the impurities are preferentially adsorbed. The equilibrium nature of the adsorption process, however, limits the amount of impurity which can be adsorbed at any given temperature, pressure and concentration of impurity in the gas being treated. Thus, in the case of a gas stream having a low concentration of impurities, the effective capacity of the adsorber will be much smaller than the capacity under conditions in which the impurity concentration is at saturation level. This problem of low adsorption capacity may be overcome by the use of very large adsorbers. Alternatively, and perhaps more usually, two adsorbers in parallel are used, one of these adsorbers being on stream while the other is being regenerated. Such regeneration has, however, hitherto always been accompanied by an apparently inevitable cold loss.

It is an object of the present invention to provide a method for the removal from a gas mixture of a preferential adsorbable constituent thereof in which adsorption of the constituent and regeneration of the adsorbent are effected under conditions such that the adsorbent is always working at higher efficiency and the cold loss during regeneration of the adsorbent is minimized.

According to one aspect of the present invention, there is provided a process for removing from a gas mixture a constituent which is preferentially adsorbed at a low temperature wherein the gas mixture is passed through at least three cyclically switchable adsorbers arranged in series and operating in a cycle divided into a number of periods equal to the number of adsorbers, during which cycle the gas mixture is always passed through the adsorbers in the same direction, wherein change-over of the adsorbers is effected between each period in such a manner that the adsorber last traversed by the gas mixture in one period becomes the adsorber first traversed by the gas mixture in the succeeding period, wherein the last adsorber traversed by the gas mixture during each period of the cycle is maintained throughout that period at the low temperature required for preferential adsorption of said constituent by heat exchange of gas passing therethrough with an external coolant, and wherein the adsorbers are switched from one period of the cycle to the next when the major part of the constituent adsorbed in the first adsorber has been expelled therefrom.

According to a second aspect of the invention, there is provided a process for removing a preferentially adsorbable constituent from a gas mixture wherein the gas mixture is passed through three cyclically switchable adsorbers arranged in series and operating in a three-period cycle, the adsorbers being traversed by the gas mixture in the orders 1 2 3, 3 1 2, 2 3 1, respectively during the three periods of the cycle, wherein the last adsorber traversed by the gas mixture during each period of the cycle is maintained throughout that period at the low temperature required for preferential adsorption of said constituent by heat exchange of gas passing therethrough with an external coolant, and wherein the adsorbers are switched from one period of the cycle to the next when the major part of the constituent adsorbed in the first adsorber has been expelled therefrom.

The process may be carried out either discontinuously or continuously, and these two methods of operation will now be described as applied to the removal of a preferentially adsorbed impurity from a gas using three adsorbers, and with reference to the accompanying drawings in which.

Figure 1:
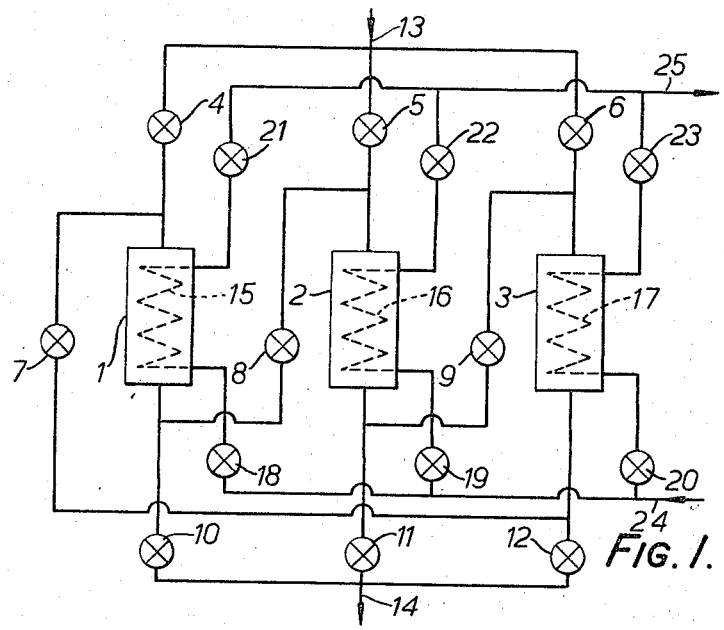
FIGURE 1 shows diagrammatically one form of apparatus for carrying out the invention.

The apparatus includes three adsorbers 1, 2 and 3, respectively, each containing a suitable adsorbent material. The adsorbers are arranged to operate in a three-period cycle, the gas to be purified being arranged to pass through the adsorbers in order 1 2 3, 3 1 2, and 2 3 1, respectively during the three periods of the cycle. The adsorbers are switched from one period to the next by operation of the valves indicated by the references 4 to 12 in the drawing, as hereinafter described. The impure gas enters the system through a line 13 and the purified gas leaves through a line 14.

The construction of each adsorber is similar, and each of the adsorbers 1, 2 and 3 is provided with heat exchangers 15, 16 and 17 respectively situated either within or just outside the adsorbent column in order to enable cold "return gas" to exchange heat with gas passing through or about to enter the adsorber. The "return gas"

consists of purified gas which has left the adsorber system and passed through a further cooling cycle, and is therefore considerably cooler than the gas passing through the adsorbers. For example, where the adsorber system forms part of a helium liquefier, the return gas may consist of gas which has been cooled down to the liquefaction temperature of about 4° K. by cooling and expansion; part of the gas is liquefied to form the required product whilst the unliquefied portion, which is also at a temperature of about 4° K. is recycled for use as the "return gas." Similarly, where the adsorber system is used in conjunction with a helium cryostat, the return gas may consist of helium at about 4° K. which has been liquefied and used to cool the cryostat with consequent revaporation, together with gas which has been cooled to around liquid helium temperature without being liquefied. This so-called return gas is used as a cooling medium in all the embodiments which will be described, but it will be appreciated that any other external cooling medium which is available may be used in its place. The flow of coolant to the exchangers 15, 16 and 17 is controlled by valves 18, 19 and 20, and its flow from these exchangers by valves 21, 22 and 23 respectively. The coolant enters through a line 24, and leaves through a line 25.

In each period of the cycle, no return gas is passed through the heat exchanger of the adsorber which is traversed first by the gas, so that this heat exchanger is not cooled. Te heat exchanger of the second or intermediate adsorber is also not cooled until the gas entering from the first adsorber has increased appreciably in temperature; this is necessary to ensure that the second adsorber is at the required low temperature before the major part of the adsorbed impurity is driven out of the first adsorber and switch-over from one period to the next takes place as will be described hereinafter. The return gas is therefore passed through the heat exchanger of this second adsorber after, say 60–80% of the time between successive switch-overs has elapsed. The return gas flows continuously through the heat exchanger of the third adsorber, keeping the adsorbent therein at a low temperature.

The discontinuous method of operating the adsorber system shown in the drawing in accordance with the process of the invention will now be described with reference to FIGURE 2. It will be assumed that the adsorbers have already been operating, but that the gas containing the impurity has just been admitted to the circuit.

Figure 2:
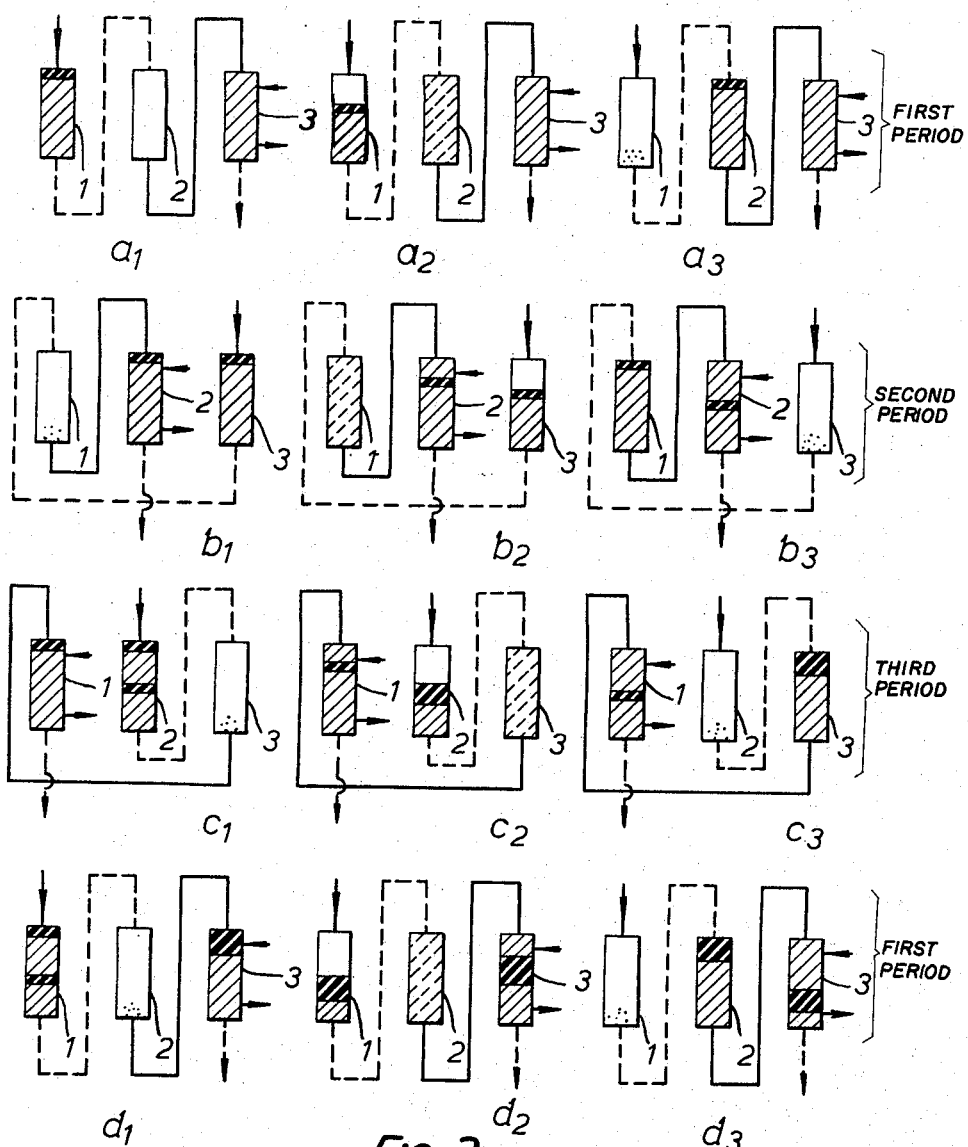
FIGURE 2 shows diagrammatically the adsorber system of FIGURE 1 during the three periods of one cycle (a, b and c respectively) and the first period of a second cycle (d)

In FIGURE 2, for each period, the adsorber system is shown at the beginning of the period, at a intermediate time and at the end of the period, indicated by the subscripts 1, 2 and 3 respectively. In FIGURE 2, warm adsorber bed is shown unshaded, a cold adsorber bed is shaded, an adsorber bed cooling from warm to cold by broken shading, an adsorber impurity in full black, conduits carrying warm gas in full lines and conduits carrying cold gas in broken lines.

In the first period of the cycle, the impure gas is caused to flow through the adsorbers in the order 1 2 3 by opening valves 4, 8, 9 and 12 and closing valves 5, 6, 7, 10 and 11. At the beginning of this period, adsorber 1 is already at the relatively low temperature at which the impurity is preferentially adsorbed, adsorber 2 is relatively warm, and adsorber 3 is relatively cold and is maintained so during this stage by passing return gas through the heat exchanger 17 associated therewith by opening valves 20 and 23. Valves 18, 19, 21 and 22 are closed. The warm impure gas entering through the line 13 passes first through the adsorber 1 which contains cold adsorbent (FIGURE 2, $a_1$). The impurities are adsorbed on the cold adsorbent, and at the same time the gas is cooled, while the temperature of the adsorbent is raised. Thus the adsorbent is progressively warmed from its upper end downwards, whilst the gas is cooled and purified. The impurities removed from the gas are concentrated towards the end of the adsorber having the lower temperature. The temperature gradient now progresses downwardly through the adsorbent bed of the adsorber 1, moving the impurities ahead of it, the adsorption equilibrium being such that the impurities are rapidly desorbed from the warm adsorbent and carried forward by the gas to the colder part of the adsorbent bed, thus creating a "plug" of adsorbent in which the concentration of impurities is high (FIGURE 2, $a_2$). The adsorption front between the warmer and cooler parts of the adsorbent bed eventually reaches the lower end of the adsorber 1, when the gas carries the desorbed impurities over into the top of the adsorber 2. The cooled and purified gas in the lower end of adsorber 1 during this stage of the cycle passes through the valve 8 to the top adsorber 2 in which it is warmed whilst cooling the adsorbent. Final cooling of the adsorber 2 to the adsorption temperature is effected by passing return gas through the heat exchange coils 16 associated with this adsorber, by opening valves 19 and 22. The warm gas leaving the adsorber 2 passes through the valve 9 into the top of adsorber 3 and is cooled by heat exchange with return gas passing through the heat exchanger 17 of this adsorber. The cooled and purified gas finally leaves the system through valves 12 and 14.

At the end of the first period of the cycle, that is to say, when the major proportion of the adsorbed impurities have passed from adsorber 1 into adsorber 2, the position of the three adsorbers is as follows: adsorber 1 is warm and contains small amounts of impurity; adsorber 2 is cold and has a concentrated adsorption plug containing a relatively high concentration of impurities near to its upper end; adsorber 3 is cold and is substantially free from impurities (FIGURE 2, $a_3$). The adsorbers are now switched to the second period of the cycle in which the flow order is 3 1 2 by opening valves 6, 7, 8 and 11 and closing valves 4, 5, 9, 10 and 12. Valves 20 and 23 are also closed to stop the flow of return gas through the heat exchanger 17 of the adsorber 3. At the beginning of this second period, adsorber 3 is cold, adsorber 1 is warm and adsorber 2 is cold and exchanging heat with gas leaving the circuit (FIGURE 2, $b_1$).

During the second period, the warm gas passes first through the adsorber 3 and establishes therein a moving temperature gradient and adsorption front. The cold pure gas leaving the lower end of adsorber 3 then passes through adsorber 1, cooling it and purging from it any residual impurities into adsorber 2 where they are adsorbed. An adsorption front is formed in adsorber 2 which progresses slowly downwardly through the adsorbent bed at a rate which is considerably slower than the rate of progress of the adsorption front in adsorber 3 which accompanies the temperature gradient (FIGURE 2, $b_2$).

Just before the adsorption front in adsorber 3 has been pushed into the now cooled adsorber 1, the final cooling of adsorber 1 is achieved by passing cold return gas through the heat exchanger 15 associated with adsorber 1 by opening valves 18 and 21, and the second period of the cycle is completed. At the end of this period the position is as follows: adsorber 3 is warm and contains a small amount of impurities; adsorber 1 is cold with a concentrated adsorption front just entered the adsorption bed; and adsorber 2 is cold with a slightly extended adsorption front part way down the column of adsorbent (FIGURE 2, $b_3$).

The adsorbers are now switched to the third period of the cycle in which the flow order is 2 3 1 by opening valves 5, 9, 7 and 10 and closing valves 4, 6, 8, 11 and 12. Valves 19 and 22 are also closed to stop the flow of return gas through the heat exchanger 16 of the adsorber 2. At the beginning of this third period, the adsorber 2 is cold, the adsorber 3 is warm and the adsorber 1 is cold and exchanging heat with gas leaving the circuit (FIGURE 2, $c_1$).

During the third period of the cycle, warm impure gas enters the adsorber 2 creating an adsorption front and a temperature gradient therein, which adsorption front overtakes and combines with the previous front part way down the adsorber column. Cold pure gas leaving adsorber 2 passes into adsorber 3 cooling it and sweeping residual impurities from it into the cold adsorber 1 (FIGURE 2, $c_2$). As before the valves 20 and 23 are opened just before the impurity front has been swept from adsorber 2 to adsorber 3.

When the front in adsorber 2 has been swept into the now cold adsorber 3, the third period of the cycle is completed. The position is now as follows: adsorber 2 is warm and contains residual impurities; adsorber 3 is cold with the adsorption front just entered; and adsorber 1 is cold and has an adsorption front part way down the column (FIGURE 2, $c_3$).

At the end of the third period, the whole cycle is repeated, valves 4, 8, 9 and 12 being opened and the valves 5, 6, 7, 10, 11, 18 and 21 closed. The adsorber 1 is now cold, the adsorber 2 warm, and the adsorber 3 cold and exchanging heat with gas leaving the circuit (FIGURE 2, $d_1$).

Warm impure gas again enters adsorber 1 and establishes an adsorption front and a temperature gradient therein, which front overtakes and combines with the previous front. Adsorber 2 is cooled and purged from residual impurities whilst adsorber 3 is cold and exchanging heat with gas leaving the circuit and also adsorbs any purged impurities swept out of adsorber 2 (FIGURE 2, $d_2$ and $d_3$).

The change-over cycle described above results in impurities being concentrated at any one time in two of the three adsorbers, i.e., the effective adsorbing capacity of the system taken as a whole is equal to the capacity of two of the adsorbers. With appropriate design, after a number of cycles it is possible by the process of the present invention to effectively adsorb up to saturation impurity concentration, thereby achieving the optimum adsorber capacity.

The change-over point from one period to the next may be indicated either by a temperature sensing device mounted at the lower end of the adsorber first traversed by the impure gas, or by an impurity sensing device placed at the top of the second adsorber to be traversed by the gas. Various types of sensing devices may be used. In the case of temperature sensors, thermocouples suitably located are adequate. If an impurity sensor is employed the discharge tube type or the catharometer type of impurity detector is suitable. It is preferred to use an impurity detector since such devices are sensitive and capable of detecting extremely low concentrations of impurities.

In a modified form of the procedure described above, the adsorption front from the adsorber through which the gas mixture is first passed is caught in the last adsorber through which the gas mixture passes (and hence the leading adsorber in the next period of the cycle) by by-passing the intermediate adsorber during the last part of each stage. In this modification, the final cooling of the adsorber 2 is omitted, and the gas in instead passed into the cold adsorber 3, which becomes the leading adsorber in the following stage. At the next change-over from the second stage to the third stage, the adsorber 1 is similarly by-passed. In this case, the impurity sensor used to indicate the change-over point will, where such a sensor is used, be located at the top of the third adsorber. By proceeding in this way, the bulk of the impurities are always concentrated in the leading adsorber. This modification has the advantage that less cooling is needed, but it is more complicated and the adsorption capacity of the system is limited to the capacity of one adsorber.

The process of the present invention is also capable of continuous operation, the impurities being condensed and subsequently removed as a liquid phase. Under such conditions, the process may be run almost indefinitely without the need for a shut-down. Two modified forms of adsorber suitable for use in such continuous operation are illustrated in FIGURES 3 and 4, in which for the sake of clarity, only the adsorber 1 of FIGURE 1 is illustrated.

Figures 3, 4:
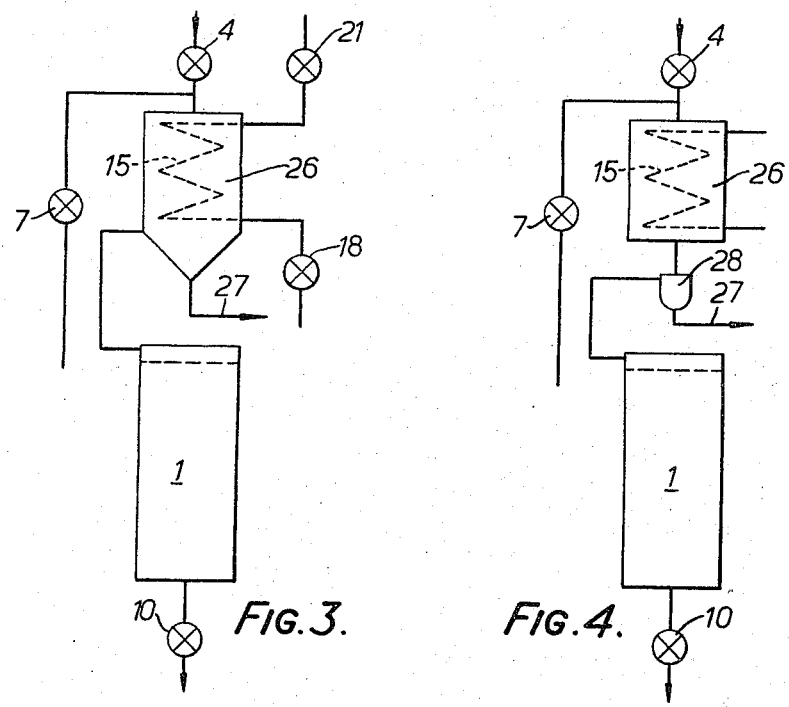
FIGURE 3 shows diagrammatically a modified form of the adsorber 1 of FIGURE 1 adapted for continuous operation.
FIGURE 4 shows diagrammatically a modification of the cooling system of FIGURE 3.

Referring to FIGURE 3, in this modification, each of the combined coolers and adsorbers of FIGURE 1 is replaced by an adsorber 1 and a combined cooler and partial condenser 26, which cools the gas entering the adsorber 1. Impurity condensed in the cooler 26 is run off through a pipe 27 and discharged through a trap (not shown). The cooling coil 15 is located within the cooler 26 instead of in the adsorber 1. If desired, the coil 15 may be replaced by any other suitable cooling device, e.g. a tubular heat exchanger. With a suitable adsorber design, the concentration of impurities in the front passing from one adsorber to another at the end of any particular period can, after a few passes of process gas, be such that a substantial part of the impurity is liquefied in the cooler 26, and can be run off through the pipe 27. Thus, continuous removal of impurities from the system can be effected with substantially no loss of working gas.

In the alternative modification illustrated in FIGURE 4, a separate catch pot 28 is provided between the vessel 26 and the line 27.

The modified form of procedure described above, in which the adsorption front from the first adsorber is caught in the last adsorber, is particularly suitable for use with the continuous method of operation, since the last adsorber is always "clean" and able to deal with any accidentally entrained impurities.

In theory, the upper and lower limiting temperatures for the heat exchange coils are the critical temperature and the triple point of the impurity (for example, 126° K. and 63° K. respectively for nitrogen). However, for the practical operation of the purification process of the present invention with helium refrigerators and liquefiers the limits lie between 65°–100° K.

While the process of the present invention is particularly applicable to the removal of impurities such as nitrogen from helium, it can equally be applied to other systems, for example, for the separation of the components in a mixture in addition to the removal of impurities. Examples of other uses to which the process of the present invention may be applied include the removal of small amounts of hydrocarbon impurities, particularly methane, from mixtures of hydrogen and nitrogen containing such impurities, the separation of neon from helium, the separation of xenon from krypton, and, at a considerably higher range of temperature, the removal of carbon dioxide from air.

What we claim as our invention and desire to secure by letters patent of the United States is:

1. A process for removing from a gas mixture a constituent which is preferentially adsorbed at a low temperature comprising the steps of passing the gas mixture through at least three cyclically switchable adsorbers arranged in series flow of the gas mixture and operating in a cycle divided into a number of periods equal to the number of adsorbers during which cycle the gas mixture is always passed serially through the adsorbers in the same direction, effecting change-over of the adsorbers from one period to the next in such a manner that the adsorber last traversed by the gas mixture in one period becomes the adsorber first traversed by the gas mixture in the succeeding period, maintaining the last adsorber traversed by the gas mixture during each period of the cycle at the low temperature required for preferential adsorption of said constituent throughout said period by heat exchange of gas passing through said last adsorber with an external coolant, and switching the adsorbers from one period of the cycle to the next when the major part of the constituent adsorbed in the first adsorber traversed by the gas mixture has been expelled therefrom.

2. A process for removing from a gas mixture a constituent which is preferentially adsorbed at a low temperature comprising the steps of passing the gas mixture through three cyclically switchable adsorbers arranged in series flow of the gas mixture and operating in a three-period cycle in which the adsorbers are traversed serially by the gas mixture is the orders first second third, third first second, second third first, respectively during the three periods of the cycle, maintaining the last adsorber traversed by the gas mixture during each period of the cycle at the low temperature required for preferential adsorption of said constituent throughout said period by heat exchange of gas passing through said last adsorber with an external coolant, and switching the adsorbers from one period of the cycle to the next when the major part of the constituent adsorbed in the first adsorber traversed by the gas mixture has been expelled therefrom.

3. A process according to claim 2 wherein as said external coolant there is used gas which has left the adsorber system and has been further cooled.

4. A process according to claim 2 including the additional step of cooling the second adsorber traversed by the gas during any period by said external coolant during a final part of the period.

5. A process according to claim 4 wherein said second adsorber is cooled by said external coolant during the last 20–40% of the period.

6. A process according to claim 2 including the step of by-passing the second adsorber traversed by the gas stream during a final part of each period, the gas stream during this final part passing directly from the first to the third adsorber.

7. A process according to claim 2 including the step of subjecting the gas leaving said first adsorber to partial condensation to liquefy a substantial amount of the impurity contained therein prior to its entry into the next adsorber.

8. A process according to claim 2 wherein the change-over of said adsorbers from one period to the next is controlled by a temperature device located at the outlet end of the adsorbent bed of the adsorber first traversed by the gas mixture.

9. A process according to claim 2 wherein the change-over of said adsorbers from one period to the next is controlled by a sensing device for the adsorbed constituent located at the inlet end of the adsorbent bed of the adsorber into which adsorbed impurity is expelled from the adsorber first traversed by the gas mixture.

10. A process according to claim 2 wherein said gas mixture is helium containing nitrogen as the preferentially adsorbable constituent.

References Cited

UNITED STATES PATENTS

| | | | |
|---|---|---|---|
| 2,799,364 | 7/1957 | Miller | 55—62 |
| 2,960,836 | 11/1960 | Haringhuizen | 62—13 |
| 3,023,841 | 3/1962 | Milton et al. | 62—18 |
| 3,073,128 | 1/1963 | Becker | 62—13 |
| 3,245,205 | 4/1966 | McCarthy | 55—62 |
| 3,254,496 | 6/1966 | Roche et al. | 62—15 |

NORMAN YUDKOFF, *Primary Examiner.*

WILBUR L. BASCOMB, Jr., *Examiner.*

V. W. PRETKA, *Assistant Examiner.*